US006466861B2

(12) United States Patent
Little

(10) Patent No.: US 6,466,861 B2
(45) Date of Patent: Oct. 15, 2002

(54) DYNAMIC SERVICE TOOL FOR AN ENGINE CONTROL MODULE

(75) Inventor: Lincoln M. Little, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 41 days.

(21) Appl. No.: 09/789,073

(22) Filed: Feb. 20, 2001

(65) Prior Publication Data

US 2002/0116114 A1 Aug. 22, 2002

(51) Int. Cl.[7] .............................................. G06F 19/00

(52) U.S. Cl. ........................ 701/114; 701/29; 701/115; 702/85

(58) Field of Search ............................... 701/101, 102, 701/103, 110, 111, 114, 115, 2, 29; 307/9.1, 10.1, 10.4, 10.6; 340/901; 702/85, 123; 707/200

(56) References Cited

U.S. PATENT DOCUMENTS 5,345,382 A 9/1994 Kao
5,396,422 A 3/1995 Forchert et al.
5,400,018 A 3/1995 Scholl et al.
5,408,412 A 4/1995 Hogg et al.
5,414,626 A 5/1995 Boorse et al.
5,426,585 A 6/1995 Stepper et al.
5,459,660 A 10/1995 Berra
5,479,347 A 12/1995 Oguro et al.
5,481,906 A 1/1996 Nagayoshi et al.
5,491,418 A 2/1996 Alfaro et al.
5,491,631 A 2/1996 Shirane et al.
5,541,840 A 7/1996 Gurne et al.
5,555,171 A 9/1996 Sonchara et al.
5,557,268 A 9/1996 Hughes et al.
5,737,711 A 4/1998 Abe
5,769,051 A * 6/1998 Bayron et al. .............. 701/115
5,781,871 A 7/1998 Mezger et al.
5,790,965 A 8/1998 Abe
5,798,647 A 8/1998 Martin et al.
5,803,043 A * 9/1998 Bayron et al. .............. 701/115
5,835,871 A 11/1998 Smith et al.
5,850,209 A 12/1998 Lemke et al.
5,884,202 A 3/1999 Arjomand
6,009,372 A * 12/1999 Baker et al. ................ 701/115
6,081,770 A * 6/2000 Struck et al. ............... 340/901
6,304,814 B1 * 10/2001 Masters et al. ............. 701/115
6,351,703 B1 * 2/2002 Avery, Jr. .................. 307/10.4

* cited by examiner

*Primary Examiner*—Willis R. Wolfe
(74) *Attorney, Agent, or Firm*—Barnes & Thornburg

(57) ABSTRACT

A system and method for calibrating a ECM relies upon the taxonomic principles of generalization. Each calibratable feature of an ECM is assigned a globally unique identifier (GUID). A table of GUIDs for a particular ECM is maintained in a memory, such as a non-volatile flash memory. A list of GUIDs is also maintained in a memory of a service/calibration tool corresponding to calibratable features for which the calibration tool includes dynamically loadable calibration code. When a data link between calibration tool and ECM is established, the tool queries the ECM GUID table and compares each GUID with the GUID table for the calibration tool. If a match is found, the corresponding calibration code is dynamically loaded in the tool and the ECM calibration function is performed for that feature. In another aspect of the invention, a specific calibratable feature may also have GUID for an associated general calibratable features. In the event that no match is found for a specific GUID in the ECM, the associated general GUID is queried by the calibration tool. If a match is found between the general GUID and the GUIDs maintained by the tool, the corresponding general feature calibration code is dynamically loaded into the calibration tool.

4 Claims, 2 Drawing Sheets

DYNAMIC SERVICE TOOL FOR AN ENGINE CONTROL MODULE

BACKGROUND OF THE INVENTION

The present invention relates to electronic engine control systems, and more particularly to systems and methods for the calibration of such engine controlled systems.

Since the late 1980's, most internal combustion engines have included an electronic control module, or ECM. The ECM controls the electronic components of the engine, such as fuel injectors, egr valve, air intake, etc. In the early years of the ECM, the module utilized specific unchangeable programs for controlling the operation of the engine.

In recent years, the ECMs have become field-programmable. This feature enables product enhancements to be made in existing ECMs at a greatly reduced cost. In a typical application, one generic control module can be programmed for many different applications, e.g., different engine ratings or different engine applications. These changes can be made without any alterations to the physical configuration of the module.

The field-programmable ECM is the last element in a chain of calibration and application software development. This chain is depicted in FIG. 1. At the beginning of the chain is a development tool 10, which is typically a personal computer. A designer uses the development tool to create application software and application-specific calibration information for an ECM 20. Each ECM includes a memory for storing a number of programs 20*a*–20*z* for control of the ECM and control of the various electronic engine components. The applications and calibration information, or sub-files, are usually developed in conjunction with the creation of a new or modified engine or fuel system ratings. For example, in the case of new engine torque requirements, an engine developer creates new torque curve data and, through the development tool 10, ultimately programs the ECM 20 with the new data. In the typical case, the development tool uses a configuration file to determine how to change data in the ECM 20. The configuration file contains information about each item in the ECM that can be monitored or calibrated and provides information that defines the compatibility situation for these items in the calibration.

Once an engine developer or software engineer creates the sub-files, the data is uploaded to a main frame computer 12 in an engine manufacturing plant or design facility. At the main frame computer 12, the sub-files generated from a number of development tools 10 are integrated and authorization levels are set for specific sub-files.

Ultimately, the sub-files initially generated at the development tool 10 are distributed via communication lines 13 to other various locations, such as engineering, service, manufacturing and end-customer sites. Each of these independent sites has a service computer 14 that receives the new downloaded information. Synthesis and calibration of similar software in the service computer 14 performs a number of data checks to verify the file information. The calibration assembler within the service computer then attaches calibration-loading instructions for an associated service/calibration tool 16. Typically, this information is downloaded to the service tool 16 through an RS232 connection 15 with the service computer 14.

The service tool 16 is the final link to updating the calibration information for the ECM 20. In a typical circumstance, the service/calibration tool 16 communicates with the ECM 20 by way of a data link 17. Typically, this data link uses an SAE J1708 interface standard and a unique handshake protocol.

The service/calibration tool 16 includes code or software programs 16*a* stored in memory. This software can be resident within the tool and activated/loaded when needed, or it can be dynamically loaded as required from a PC. This component of the service tool includes code for all of the update and calibration functions accomplished by the tool 16. For instance, the code can include software for updating engine ignition data, cruise control attributes, etc. or for providing software control enhancements to the ECM. Since every ECM does not require every enhancement or calibratable function, the service tool 16 only dynamically loads calibration code from the module 16*a* that is necessary under the circumstances. This dynamic loading feature can be accomplished automatically when the service tool 16 is linked to the ECM, based upon the calibratable ECM data. Alternatively, the technician can selectively load the code, depending upon selected calibrations to be made.

As a further alternative, rather than dynamically loading the code, the subject code can be resident within the ECM, but inactive. In this case, the dynamic loading function performed by the service tool entails sending a signal to the ECM to "activate" the specific code or calibration information.

While the calibration chain shown in FIG. 1 has significantly improved engine design and development, there is always room for improvement. One problem arises where new engine models or variations of engine models are developed and introduced to the marketplace. Typically each new engine requires a new engine calibration. In prior systems, the service tool 16 must have complete compatibility with the particular ECM 20. In the case of a new engine, the new ECM is often unrecognizable to the existing service tool 16, which ultimately prevents the technician from calibrating or upgrading the engine control.

With these prior systems, the first action taken by the service tool when it interfaces with an ECM is to read an application identifier stored within the ECM. This application ID carries information as to the calibration of the particular engine— e.g., engine type, etc. Next, the tool reads from the ECM information relating to the version level of the calibration. If the specific service tool supports the particular version level of the subject ECM, the calibration can be changed and updated. However, if the version level in the ECM is different than that supported by the tool, the tool is inhibited from accessing the calibration at all. Thus, with these prior systems, absolute compatibility is required between the service tool and the engine and ECM to be calibrated or updated.

This problem can arise where the new ECM incorporates a small change in an existing calibration feature. In addition, difficulties occur when the new ECM has a feature added to the standard calibration.

In either case, the existing service tool can be prevented from working with the calibration for the new ECM. What is needed is a service tool and ECM relationship that is more akin to physical maintenance of an engine. In other words, an engine mechanic can be faced with a brand new engine design and still be able to use standard tools to service virtually every feature of the engine. The only aspect of the new engine that may not be directly serviceable by the mechanic is a brand new, unfamiliar feature. Even in that instance, there may be certain aspects of the new physical engine feature that can be adjusted or maintained by the mechanic.

This same circumstance does not inhere in the software end of the engine. The limitations that presently exist between the service tool and the ECM do not allow the electronic calibration world to emulate the physical component world. There is therefor a need for a service tool and ECM interface protocol that overcomes the compatibility barriers present with systems of the prior art.

SUMMARY OF THE INVENTION

These problems with the engine evaluation, upgrade or calibration chain are addressed by aspects of the present invention that emulate the physical world. More particularly, the invention resides in a recognition that features of an engine control module can be divided into specific features and general features. These features may be manipulated, upgraded, read/written or calibrated by the service tool. For example, a general feature may be the engine cruise control, while the specific feature corresponds to a particular type of cruise control system.

In accordance with one aspect of the invention, each calibratable feature maintained in the ECM is assigned a globally unique identifier (GUID). The ECM can maintain a table in a memory, which can be a non-volatile memory such as a flash memory. The table can contain a list of features associated with that ECM, as identified by GUID. These features may be subject to modification or re-calibration by the service tool, or can simply be features that are read or written by the tool, depending upon the application. The table can relate each specific GUID to a general GUID, if one exists for the particular feature. In the cruise control example, a GUID of 150 can be assigned to a specific cruise control system. That GUID is stored in the ECM non-volatile memory. In addition, a GUID of 100 can be assigned to the general cruise control feature, of which the specific cruise control is a member. The relationship between the specific GUID 150 and the general GUID 100 can be retained in the ECM non-volatile memory.

In a further feature of the invention, the service/calibration tool queries the ECM through a standard communication link. Specifically, the calibration tool reads the contents of the ECM non-volatile memory to extract the GUIDs for the calibratable/upgradable features of the ECM. Where a specific GUID has a corresponding general GUID, it is also read. The calibration tool then compares the list of GUIDs to determine whether the tool includes calibration or upgrade software corresponding to the ECM calibratable features. This comparison is achieved in the preferred embodiment by comparing the list of GUIDs obtained from the ECM to a corresponding list within the calibration tool. In a most preferred embodiment, this list comparison proceeds from the more specific feature to the most general. Where GUIDs match, the calibration tool will dynamically load or access calibration/upgrade software associated with the particular GUID, or calibratable/upgradable feature.

In the nominal case, each specific GUID will correspond to dynamically loaded code within the calibration tool or inactivated code within the ECM itself. However, in some instances, a specific GUID extracted from the ECM will not have a corresponding GUID in the calibration tool. In this case, the calibration tool then turns to the general GUID to which the specific GUID is associated. If such inheritance relationship exists, the calibration tool will dynamically load the calibration software associated with the general calibratable/upgradable feature. In the cruise control example, the general calibratable feature may include calibration data for maximum speed or set/resume activation features that are common to all cruise controls.

In some case, the calibration tool will not have a GUID that corresponds to a particular specific or a general GUID in the ECM. Such a circumstance may arise when a brand new feature has been added to an ECM and the calibration tool has not been upgraded to recognize that new feature. Thus, when no GUID match is found within the calibration tool, no calibration of that new feature in the ECM occurs.

One benefit of the present invention is that it allows the software world of the field-programmable ECM to emulate the physical world when it comes to calibration or upgrade of an ECM. The invention avoids the characteristic problem of the prior art that a particular calibratable/upgradable feature of an ECM would be entirely ignored because it included a new aspect not yet recognized by the calibration tool.

Another benefit of the invention is that it allows older or non-upgraded calibration tools to retain some functionality, even as new generations of ECMs are developed. The present invention allows those calibration tools to perform calibrations of general features of the ECM, even when those features have experienced first, second and third generation improvements.

Other benefits and certain objects of the invention will become apparent upon consideration of the following written description and associated figures.

DESCRIPTION OF THE PREFERRED EMBODIMENTS

Figure 1:
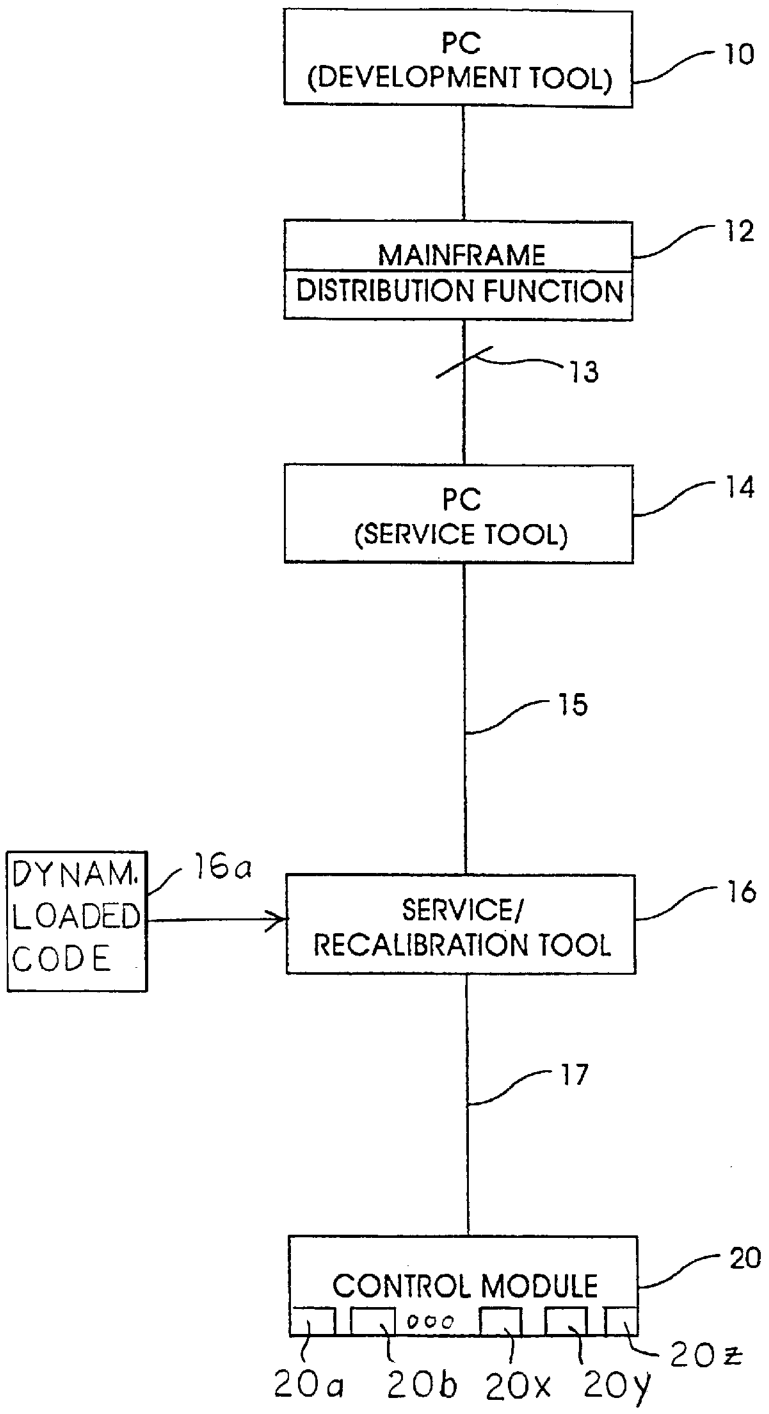
Fig. 1 (PRIOR ART)
FIG. 1 is a block diagram of a known engine control module calibration/calibration system.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention addresses problems of the prior art using the taxonomic concept of generalization. This concept establishes a relationship between a more general element and a more specific element. The specific element is fully consistent with the more general element, but contains additional information or capability. For example, a specific type of diesel engine still falls within the general category of engines. When filling a diesel truck with fuel it is not necessary to know the specific type of diesel engine, only that the engine falls within the general field of diesel engines.

These same principles can be applied to the service/calibration tool 16. By way of example, a vehicle engine can include a cruise control feature of a specific type, designated for example purposes as an "opti-cruise" cruise control feature. The "opti-cruise" is a species or specific type of cruise control in general. Like all devices within the cruise control realm, the "opti-cruise" incorporates certain general features. For example, the general cruise control has an enable/disable control, the capability of establishing a maximum vehicle speed and a set/resume feature. On the other hand, the more specific "opti-cruise" can have features that are unique and not found in all members of the cruise control family.

For example, the "opti-cruise" can have a specific calibration relative to an infrared or optical sensor affiliated with the "opti-cruise" cruise control. Although this specific feature may be externally calibratable, to do so would require knowledge of the specific "opti-cruise" feature. Knowledge of general cruise controls is insufficient to establish calibration or upgrade of this specific unique aspect of the "opti-cruise." Likewise, the specific "opti-cruise" feature can itself constitute a more generic feature to a specific type of "opti-cruise", such as an application-specific cruise control that is enabled by the emergency brake.

It can thus be appreciated that the present invention utilizes a feature inheritance hierarchy. Specifically, certain calibratable or upgradable engine features can be categorized from the most general aspect to the most specific, with each successively more specific feature inheriting the characteristics of the more general features.

Figure 2:
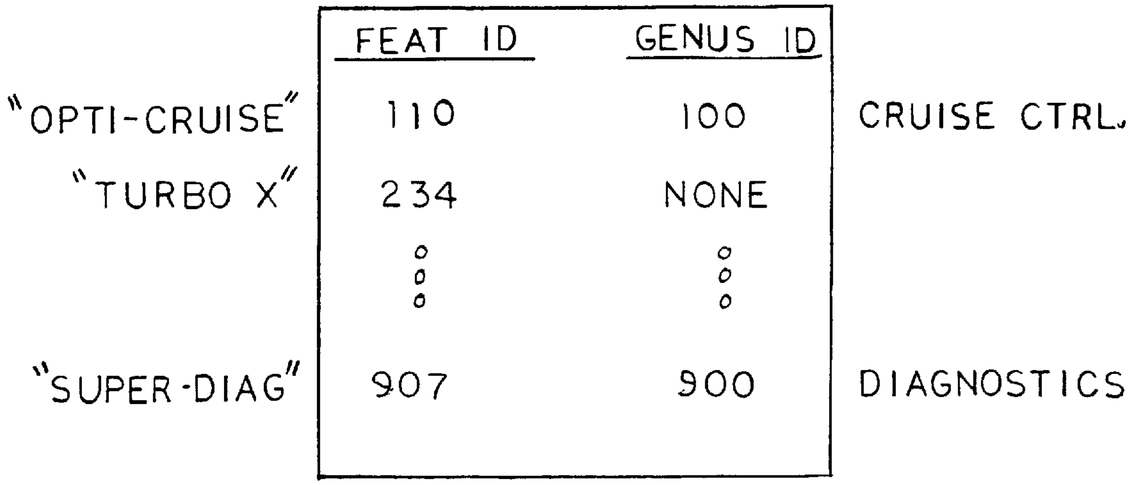
FIG. 2 is a block representation of data for a feature inheritance hierarchy stored with a memory of the ECM for access using a protocol in accordance with one embodiment of the present invention.

In order to implement this analysis, the present invention contemplates a globally unique identifier (GUID) associated with each calibratable or upgradable feature of electronic control modules (ECMs). Globally unique identifiers can be assigned to each general feature as well as to each specific feature. An example of this relationship is depicted in the diagram of FIG. 2. This figure represents information stored within the ECM 20. Preferably this information can be maintained in a non-volatile memory of the ECM, such as a flash memory. Upon initiation of a calibration sequence the service/calibration tool 16 would automatically query the contents of this memory.

In one particular example as shown on FIG. 2, a specific feature can have a GUID of 150. This specific feature can constitute an identifier for the specific cruise control "opti-cruise." While the specific feature has a unique GUID, it can be associated with the general cruise control family. This general feature is assigned a GUID of 100 in the illustration.

Thus, in the illustrated example, on the one hand the specific "opti-cruise" falls within the general cruise controls, which has been assigned GUID 100. Cruise controls falling within this general category all have certain common calibratable features, such as enable, maximum speed, set/resume, etc. The "opti-cruise" having the GUID of 150 can have additional calibratable features that are not common to all other cruise controls in general. In the illustrated example of FIG. 3, the "opti-cruise" adds a specific "opti-cruise" enable feature.

Following the system architecture shown in FIG. 1, the GUIDs that are stored within the non-volatile memory of the ECM 20 are automatically accessed by the service/calibration tool 16 once a communication link has been established via data link 17. In the most preferred embodiment, the service tool operates in a reverse nested mode—i.e., by reading the feature GUIDs from specific to general. Each GUID is compared to a table stored in a memory, preferably a non-volatile flash memory, of the calibration tool. This table lists all feature I.D.'s, whether specific or general, for which the service/calibration tool 16 has associated calibration or upgrade software/code. When a match is determined between a GUID read from the ECM 20 and a GUID maintained in the service tool table, the service tool is directed to dynamically load the associated calibration software or program code into active memory for the tool. This dynamically loaded code can then be used by the service tool 16 to transmit calibration information through the data link 17 directly to the appropriate location within the ECM 20.

Alternatively, this dynamically loaded code can already be resident within the ECM. In this instance, correspondence between GUIDs causes the service tool to transmit what amounts to an activation code to the ECM to direct the module to convey the calibration/upgrade information to the appropriate location within the ECM.

Figure 3:
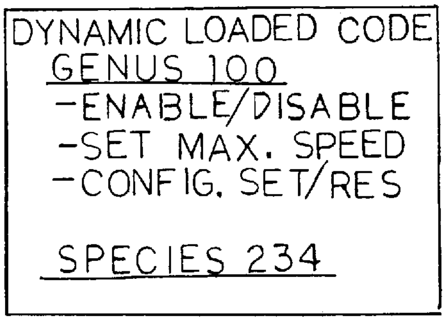
FIG. 3 is a block representation of dynamic loaded software code within the service/calibration tool for the feature hierarchy in accordance with one embodiment of the present invention.

In accordance with the illustrated embodiment of FIG. 3, the feature GUID table maintained in the service tool associates every calibratable/upgradable aspect with each particular feature. In other words, the general cruise control feature having GUID 100 includes enable, set/resume and max speed calibrations. The more specific "opti-cruise" feature having GUID 150 also includes these three calibrations as well as the "opti-cruise" enable calibration. Alternatively, the calibrations for the more specific feature (GUID 150) can include only the specific calibration ("opti-cruise" enable) and a reference to the general feature (GUID 100) to extract the generalized calibrations. This latter approach can more closely resemble a calibration inheritance scheme.

If the service tool does not find a match between a GUID read from the ECM 20 and any of the GUIDs listed in the service tool table, the service tool then reads the information for the general feature associated with the specific feature. Thus, in the illustration in FIG. 2, the service tool 16 would first read the specific feature identification 150. If this GUID is not found in the stored table within the service tool 16, the tool then reads the general GUID 100 from the ECM. This general GUID 100 can be compared with the onboard table for the service tool. If a match is found, the service tool is directed to dynamically load calibration data associated with that particular feature.

FIG. 3 depicts this simple representation in which the calibration code for the general feature having a GUID of 100 includes an enable calibration, set/resume calibration, and maximum cruise speed calibration. Each of these three calibrations is common to all cruise controls falling within the general feature 100. In this instance, the particular service tool 16 does not have any dynamically loaded calibration code associated with the specific features of 150 and 200.

Using this same approach, the particular calibratable features of the ECM can be arranged not only as general feature and specific feature but also as sub-specific feature. Even in the instance of sub-specific feature, the sub-specific feature is assigned a unique GUID as shown on FIGS. 2 and 3. In the illustrated example, the sub-specific feature has a GUID of 200 and can correspond to a specific type of "opti-cruise"—in this case, one that is enabled using the emergency brake.

The service tool thus undertakes the same analysis of the GUID as described above. Specifically, the service tool can evaluate the GUID of the sub-specific feature, determine if that GUID matches any GUID in the onboard table for the service tool, and then proceed accordingly as described above. For an early generation service tool, this tool may still not have a GUID for the sub-specific feature within its correspondence table. In that case, the tool defaults to the dynamically loaded code corresponding to the general cruise control feature (GUID 100). On the other hand, a second-generation service tool may include calibration software associated with the specific feature (GUID 150), in which case the corresponding calibration information would be loaded into operating memory.

As shown on FIGS. 2 and 3 and using the "opti-cruise" example, a second-generation cruise control system designated "opti-cruise with emergency brake enable" can constitute a sub-specific feature. In this instance, the sub-specific feature can have its own calibratable features that may not be available with a particular service/calibration tool 16. On the other hand, if the service tool has been upgraded to accommodate the original "opti-cruise," the GUID 200 can be associated with specific dynamically loaded calibration software.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, the cruise control feature has been designated for illustrative purposes. It is understood that a vehicle engine or ECM may include many more calibratable features, such as "FEATURE B" in FIG. 2, and FEATURE jj in FIG. 3. One ECM may include several such calibratable or upgradable features, each having its own inheritance hierarchy. In some cases, the calibratable feature is itself simply a general feature, while in other cases, a lengthy hierarchy through several sub-specific levels may be involved. The present invention can accommodate inheritance chains of any length, limited only by the memory capabilities of the ECM and service tool.

What is claimed is:

1. A method for modifying an engine control module (ECM) having a plurality of calibratable or upgradable software features, comprising the steps of:

assigning a globally unique identifier (GUID) to software features of the ECM;

providing a calibration tool that maintains information for calibrating/upgrading certain of the software features;

maintaining, within the ECM, a table of GUIDs for software features stored within the ECM;

maintaining, within the calibration tool, a table of GUIDs for software features for which the tool has associated calibration or upgrade information;

comparing GUIDs in the ECM table with GUIDs in the calibration tool table; and providing the associated calibration or upgrade information to the ECM if a match occurs.

2. The method for modifying an engine control module according to claim 1, wherein the step of providing the associated calibration or upgrade information to the ECM includes:

dynamically loading the information within the calibration tool; and operating the calibration tool using the dynamically loaded calibration/upgrade information to calibrate/upgrade the ECM.

3. The method for modifying an engine control module according to claim 1, wherein:

the step of assigning a GUID includes;

identifying specific and general calibratable/upgradable software features; and assigning a unique GUID to each specific and general feature; and the step of comparing GUIDs includes:

first comparing the GUID corresponding to a specific software feature;

if no match arises, next comparing the GUID corresponding to a general software feature; and providing the associated calibration/upgrade information for the general feature to the ECM if a match occurs.

4. The method for modifying an engine control module according to claim 1, the step of assigning a GUID includes:

defining an inheritance relationship between general and successively more specific software features; and assigning GUIDs indicative of this inheritance relationship.

* * * * *